Dec. 6, 1960 A. L. SARTORIO 2,962,855
FRUIT STRIPPING DEVICE
Filed March 28, 1958
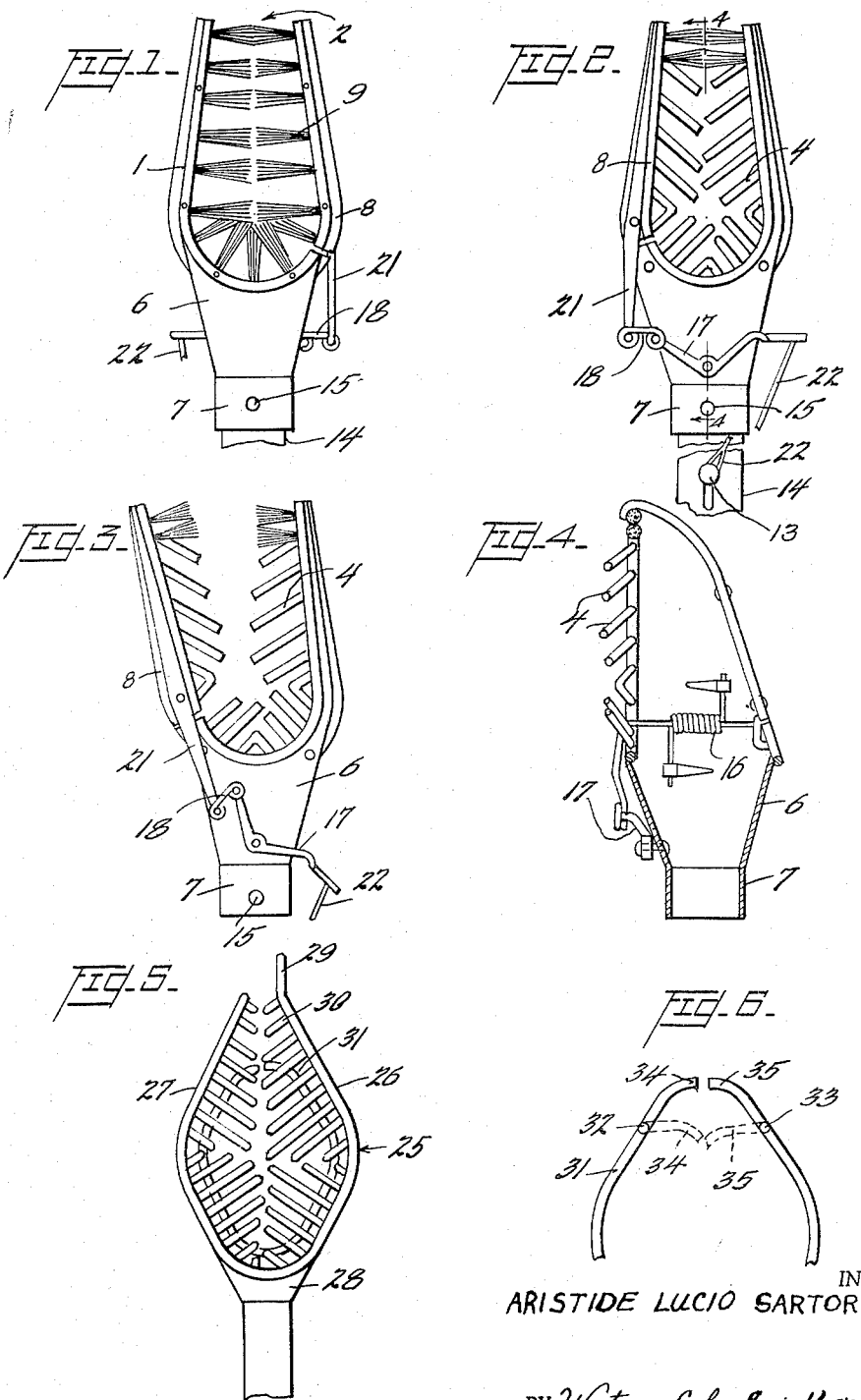
INVENTOR
ARISTIDE LUCIO SARTORIO
BY Watson, Cole, Grindle + Watson
ATTORNEY

United States Patent Office 2,962,855
Patented Dec. 6, 1960

2,962,855

FRUIT STRIPPING DEVICE

Aristide Lucio Sartorio, Piazza del Teatro, Velletri, Italy

Filed Mar. 28, 1958, Ser. No. 724,538

Claims priority, application Italy Apr. 3, 1957

5 Claims. (Cl. 56—334)

This invention relates to an agricultural implement or device, and more particularly, to a device for picking fruit or berries.

Priorly, numerous types of devices have been employed to harvest fruit and berries, however, these devices exhibit certain disadvantages. For example, these devices are very impractical for picking small fruits or berries and they incorporate no provision for removing the fruits or berries without damaging the plant or tree.

Accordingly, it is an object of this invention to provide an improved agricultural implement for harvesting fruit or berries.

It is another object of this invention to provide an improved agricultural device for harvesting fruit or berries which picks or detaches the fruit or berries, prevents them from falling to the ground, and collects these fruits or berries without damaging the plant.

Briefly, in accordance with aspects of this invention, the device is formed of two parts. The first part detaches the fruit and prevents it from falling to the ground. The second part collects the detached fruit in a suitable container connected to the second part. In accordance with one illustrative embodiment of this invention, other means are provided for preventing the detached fruit from dropping to the ground, as well as centering the branch with respect to the implement thereby preventing injury to the branch.

The first part is essentially formed from a tubular U-shaped frame having a pair of depending forks. One of the forks is pivotally mounted relative to the other portion of the frame. The U-shaped frame member has a pair of opposed edges, and on one of the edges, rigid, semi-rigid, or flexible teeth are mounted. On the other edge, a flexible material such as dense hair is mounted. The resilient teeth are sufficiently rigid to prevent the passage of berries or fruit therebetween. The flexible material on the opposite edge, however, permits the passage of leaves and fruit therethrough. The second part comprises a hopper on the base of the U-shaped frame member which is hollow and the hopper is connected by means of conduits to a suitable container.

These and various other objects and features of the invention will be more clearly understood from a reading of the detailed description in conjunction with the drawing in which:

Figure 1 is a view in elevation of one illustrative embodiment of this invention taken normal to one of the edges;

Figure 2 is a view in elevation of the illustrative embodiment of Figure 1 taken normal to the other of the edges;

Figure 3 is a view in elevation of the device of Figure 2 in which the frame member is opened for engagement with the branch;

Figure 4 is a view in section taken along the lines 4—4 of Figure 2 with the dense elements omitted;

Figure 5 is a view in elevation of another illustrative embodiment of this invention; and Figure 6 is a detail of the embodiment of Figure 5.

Referring now to the drawing, and particularly the embodiment of Figures 1 through 4, the implement or device is formed from a first member which is in the form of a frame or tubular U-shaped member 1 open at one end 2, and provided with suitable teeth 4 on one edge thereof. The other end of the frame 1 terminates in a hopper 6 which communicates through a tube or conduit 7 with the collecting container (not shown).

To facilitate the introduction of the branch into the implement, the head or frame member may have one of the forks, such as fork 8, pivotally mounted with respect to the hopper and a spring to maintan the fork 8 substantially parallel to the other fork.

This device, if improperly handled, would permit the fruit to fall outside the hopper 6. This disadvantage is avoided by providing on the opposite or other edge, a layer of sufficiently thin, flexible, and dense elements 9, which permit the branch, leaves, and fruit to pass through without appreciable friction. The elements 4 are sufficiently rigid to pull the fruit from the branch and prevent the fruit from passing through the teeth. The fruits which are thus retained between the teeth 4 and the dense elements 9, fall through the hopper 6 and the conduit 7 into a suitable receptacle (not shown).

To facilitate the introduction of the branch into the implement, the head, which includes forks and a hopper connecting the forks, may have one fork 8 pivotally mounted with respect to the hopper 6. The fork 8 is retained in a substantially parallel position with an opposite fork by means of a spring member 16, best seen in Figure 4. The means for producing relative movement between the two parts of the frame 1 will now be described. A lever 17 is pivotally mounted on the hopper 6 and is connected by a connecting rod 18 to an arm 21, secured to the portion 8. Means are provided for actuating the lever 17 which means include a flexible cable 22 connected to lever 17 and to a pin 13 slidably mounted in section 14 of the conduit. Manual translation of pin 13 then actuates or opens the fork 8. Advantageously, this pin 13 may be connected to similar pins slidably mounted in slots along the conduit whereby the device may be actuated at a point remote from the frame 1 and remote from pin 13. Section 14 is secured to conduit by means of a pin 15, Figures 1 and 3.

Referring now to Figures 5 and 6, there is depicted another illustrative embodiment of this invention and a detail of this embodiment respectively. In this embodiment, the frame 25 is defined by a substantially oval member in which the respective sides 26 and 27 are rigidly connected to a hopper 28. The end 29 of side 26 extends beyond the end of side 27, thereby facilitating engagement with the branch. The fingers 30 are sufficiently flexible to permit the passage of the branch down to a position centrally of the frame 25. On the opposite side of the frame 25, that is in the background of Figure 5, there is shown a member 31 mounted on the frame 25. As best seen in Figure 6, this member 31 is secured to the frame 25 by a pair of pins 32 and 33, adjacent the ends of the member 31. The ends 34 and 35 of the member 31, are resilient and will move from a position shown in solid lines in Figure 6 to the position shown in dotted lines in Figure 6, to permit the passage of a branch therebetween. Subsequently, the ends 34 and 35 return to their initial position as shown in solid lines in Figure 6. The member 31 now acts as a centering device to retain the branch substantially in the center of the head 25, thereby preventing damage to the branch. The implement is now moved relative to the branch, thereby causing the fingers 30 to pick the fruit from the branch, whereby the fruit drops into the hopper 28 and falls through the conduit connected to the hopper to a suitable container.

It is understood that the spacing between the teeth 4 and 30 is such that the distance between parallel teeth is slightly less than the minimum size of the fruit to be plucked. For plucking different fruit, it is, of course, possible to change the set of teeth. It is also understood that the space between the various teeth permits the free passage of the branches and its respective leaves and buds without damage.

While I have shown and described two embodiments of this invention, it is understood that the features thereof, may be employed in the other embodiments without departing from the spirit and scope of this invention.

What is claimed is:

1. A device for picking agricultural products comprising a tubular U-shaped member including a pair of forks having opposed edges thereon, and spaced apart to permit the passage of a branch therebetween, pivot means connecting one of the forks of said U-shaped member to the remaining portion of said U-shaped member, a first series of flexible elements adjacent one edge of said U-shaped member and a second set of flexible members adjacent the other edge of said U-shaped member, and lever means for actuating said pivotally mounted fork whereby said device may be opened to permit entrance of a branch, closed to engage the branch and moved relative to said branch thereby, to remove the agricultural products and retain these products between said first and said second series of flexible elements.

2. A device according to claim 1, wherein said device includes a tubular conduit connected to said member for conducting said agricultural products away from said frame member.

3. An implement for picking agricultural products, comprising a frame member including a pair of forks having an aperture therebetween, means pivotally mounting one of said forks relative to the remaining portion of said frame, a first set of resilient members positioned on one edge of said frame member and a second set of resilient members having a greater cross-sectional area than said first set, and mounted on the other edge of said frame member, wherein said agricultural products are entrapped between said sets of resilient members within said frame member, when said member engages a branch and is passed along said branch.

4. A device for picking agricultural products comprising a tubular frame including a pair of forks depending therefrom in spaced relationship to permit the passage of a branch therebetween, said forks having edges thereon, and a set of teeth mounted on one of said edges and the ends of said teeth being spaced to permit the passage of the branch therebetween, the spacing between adjacent teeth being less than the diameter of the smallest agricultural products to be picked.

5. A device according to claim 4 including a resilient member secured to the other edge of said forks opposite said resilient teeth, said resilient member having flexible elements adjacent the ends of said forks to receive said branch whereby said resilient member acts to center the branch relative to the forks and prevent injury to the branch.

References Cited in the file of this patent

UNITED STATES PATENTS

| | | |
|---|---|---|
| 743,894 | Lawrence | Nov. 10, 1903 |
| 774,793 | Sharp | Nov. 15, 1904 |
| 2,796,721 | Mattei | June 25, 1957 |